United States Patent [19]
Kuper et al.

[11] Patent Number: 4,687,694
[45] Date of Patent: Aug. 18, 1987

[54] DECORATIVE TILE

[76] Inventors: Nina M. Kuper, 2520 N. Gordon Ct., Milwaukee, Wis. 53212; Janis I. Kalnajs, 724 E. Wells, Milwaukee, Wis. 53202

[21] Appl. No.: 701,073

[22] Filed: Feb. 13, 1985

[51] Int. Cl.⁴ .................. B32B 3/30; B32B 13/02; C04B 31/06; C04B 31/26
[52] U.S. Cl. ................................ 428/156; 106/110; 106/DIG. 2; 106/DIG. 3; 156/39; 156/42; 252/378 P; 264/DIG. 6; 428/219; 428/312.4; 428/312.6; 428/313.7; 428/317.9; 428/324; 428/331; 428/703; 428/920
[58] Field of Search ............... 428/703, 324, 331, 156, 428/219, 312.4, 312.6, 313.7, 317.9; 106/DIG. 2, DIG. 3, 110; 252/378 P; 156/39, 42; 264/DIG. 6

[56] References Cited

U.S. PATENT DOCUMENTS

| | | | |
|---|---|---|---|
| 3,311,516 | 3/1967 | Jaunarajs et al. | 106/110 |
| 3,369,929 | 2/1968 | Petersen | 106/109 |
| 3,862,881 | 1/1975 | Taniguchi et al. | 106/110 |
| 4,081,283 | 3/1978 | Lombard et al. | 106/110 |
| 4,148,660 | 4/1979 | Lombard et al. | 106/110 |
| 4,328,178 | 5/1982 | Kossaty | 106/110 |
| 4,403,006 | 9/1983 | Bruce et al. | 428/703 |

*Primary Examiner*—James C. Cannon
*Attorney, Agent, or Firm*—Howard Olevsky; Philip G. Meyers

[57] ABSTRACT

A gypsum plaster and chopped glass fiber tile having increased insulation values, reduced weight and reduced density due to the presence of vermiculite and perlite.

7 Claims, 1 Drawing Figure

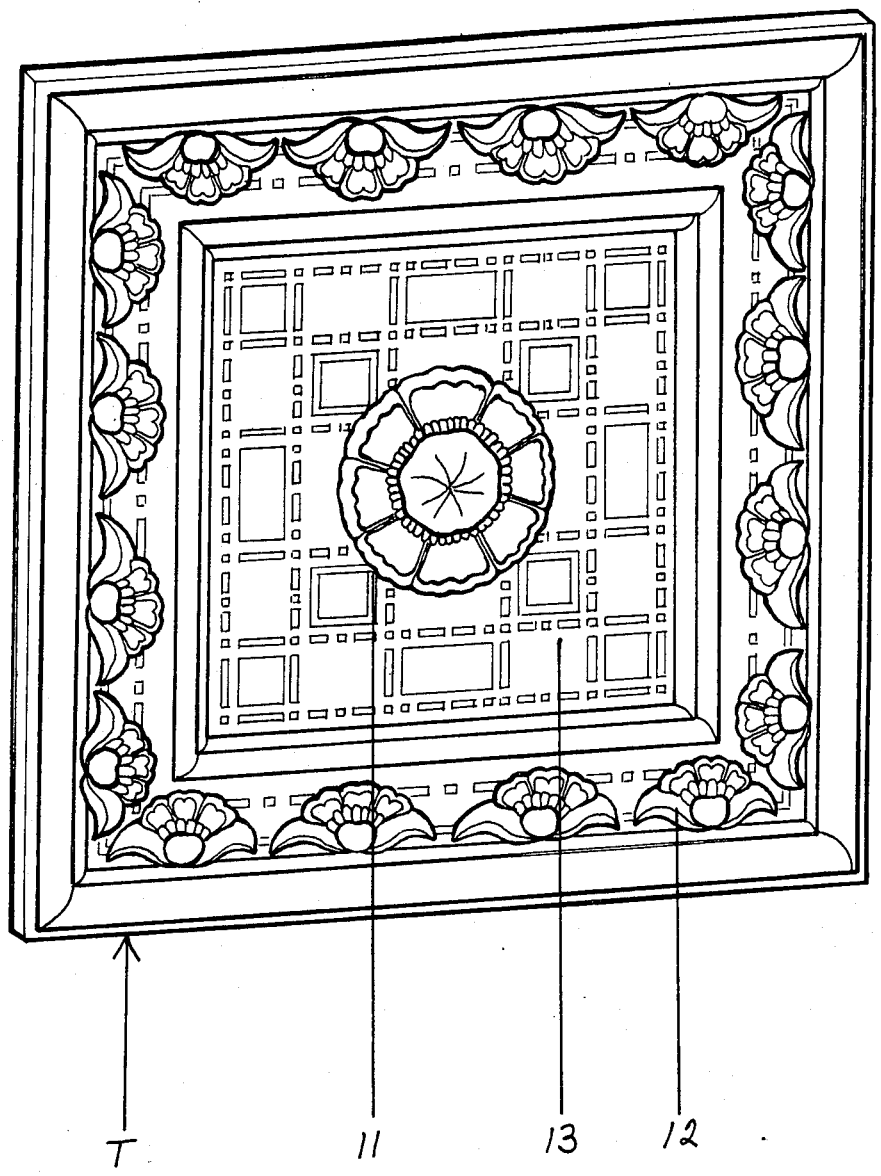

DECORATIVE TILE

FIELD OF THE INVENTION

This invention relates to construction tile and particularly plaster-based construction tile.

BACKGROUND OF THE INVENTION

Gypsum plaster-based decorative tile is heavy, bulky and frangible with minimal insulation value. It can, however, be molded to provide decorative three dimensional designs of intricate, sharply defined configurations. Due to the high weight and relative difficulty in manufacturing compared to other building materials, molded titles or slabs of gypsum plaster-based construction material have never gained popularity.

Within the past couple of decades, mineral wool-based ceiling tiles have been used in conjunction with a hanging grid system to provide a relatively inexpensive lightweight ceiling tile which can be put in place rather quickly. Ceilings of this type are not aesthetically pleasing because the type of designs possible for these ceiling tiles are extremely limited, and generally, the painted metal grid system is readily discernible as a separate element.

SUMMARY OF THE INVENTION

According to this invention a molded construction tile of the gypsum plaster type is provided which is easily manipulated and, due to its relatively reduced weight and density, increased insulative value, and increased fire retardant capacity, can be used in ceiling grid systems. As a result of its moldability, the tile can provide design profiles of differing depth and configuration across the face of an individual tile. This is accomplished by forming a gypsum plaster-based tile by including vermiculite, perlite, glass fibers and preferably mica to control density while increasing other desirable properties, as will be discussed more fully below.

DETAILED DESCRIPTION OF THE INVENTION AND DRAWINGS

The invention may be more readily understood by reference to the drawings in which FIG. 1 is a plan view of an ornamental ceiling tile made according to this invention.

As can be seen in FIG. 1, a tile T made according to the teachings of this invention can have a complex shape with several different elements of differing heights. In this particular embodiment, the tile T has an intricate raised peripheral pattern 12, a coffered area 13 inward from the peripheral pattern 12 and a center medallion 11 surrounded by the coffered area 13. Each of these pattern sections has portions of differing heights or depth from the tile surface.

The lightweight gypsum plaster ceiling tiles of this invention are formed by adding vermiculite and perlite and, in a particularly preferred embodiment, mica ore along with glass fibers to form an aggregate. This aggregate, when combined with the gypsum plaster can provide a construction tile with a bulk density of up to 25 gm/cubic inch or as little as 3 gm/cubic inch. The density in use being determined by the load bearing capacity of the suspension system, the acoustic and thermal insulation ratings required, and the fire rating desired. The tile of this invention can be made as much as eight times thicker per unit weight when compared to a glass reinforced gypsum plaster tile without the added components of this invention.

Conventional gypsum plaster tiles or panels generally include gypsum plaster in combination with chopped glass or sisal fiber. While other materials may be used in minor amounts as diluents, the major componenets remain the plaster which provides compressive strength and structure and the glass or sisal fiber which is added for tensile and break strength.

Glass fiber, as set out above it is also necessary for the tile formed according to this invention. When a tile or panel of the gypsum plaster is subjected to bending forces sufficient to crack the tile, the glass fiber spans the crack so that the tile will not fall apart.

Also glass tends to prevent cold flow i.e. sagging when the tile absorbs moisture. While the fiber is chopped in a variety of sizes, the length of the fibers, i.e. chop, preferred for this invention is generally a half inch to one inch. While shorter fiber chop, such as a quarter or an eighth of an inch, may be used, the longer the fiber the better it is in spanning the break, and holding the tile together. Generally, a glass level of two ounces per square foot of tile is used in the mixture formation. Excessive amounts will decrease the plaster to aggregate ratio which results in reduction of density and compressive strength.

Perlite is used as a bulk enhancer, i.e. it increases the bulk of the tile and the resulting airspaces while decreasing the overall weight. This increase in bulk per unit weight increases the insulating value of the tile. Perlite also serves an important manufacturing function in that it adds "green strength". This strength relates to the strength of the tile during molding before the tile is fully cured and dry and the increase in green strength enables the tile to be more easily removed after molding.

The amount of perlite used is coincident with the amount of vermiculite and a ratio of one-to-one by volume is generally preferred although the relationship of these two components may very approximately 20% in either direction. If perlite is present in excess, in relation to the amount of vermiculite, the uncured mixture is difficult to work with.

Vermiculite is used as a component in the aggregate of this invention to perform some of the functions that perlite does. It reduces heat transfer and increases bulk. It does not, however, have any influence on "green strength" except that an excess greater than that ratio set out in the preceding paragraph weakens green strength. The addition of vermiculite does tend to make the formula more fluid and workable during the manufacturing process.

Mica ore is particularly useful for adding fire resistance. ASTM E. 119 is a test for construction materials based upon heat transfer which is given in terms of an hourly rating of transfer of heat through a particular material tested. The presence of mica ore substantially increases the hourly rating and is therefore a generally desirable component in construction situations where extra heat transfer resistance is important. Generally, mica is added at a level between 1 and 3% by weight.

The choice of aggregate to plaster ratio is determined by a variety of construction factors such as the apparatus used in manufacturing the tile and the strength desired. While the amount of glass fibers on a per weight basis as discussed above is relatively constant, the other components of the aggregate may be varied depending upon the particular balance between compressive strength resulting from the gypsum plaster and the lessened bulk density obtained by adding the other components of the aggregate.

A currently preferred formulation for used in the manufacture of a ceiling tile is;

gypsum molding plaster 2724 grams (containing 2000 cc water)
methyl cellulose—5 grams
½ inch glas fibers—277 grams
vermiculite—1400 cc
perlite—1400 cc In order to obtain a uniform slurry, the incorporation of an agglomerating agent is desirable. Agglomerating agents are, typically, hydrophilic colloids and are usually polysaccharides which may have been physically or chemically modified. Suitable polysaccharides are modified cellulose, vegetable gums and starch which has been gelatinized or chemically modified. Cellulose ethers such as methyl cellulose are currently preferred. For the formula set forth above, 2000 cc of a 2% methyl cellulose solution provides the desired slurry consistency.

This mixture may be processed in the same manner as gypsum-based molding plaster panels. These processes are well known in the construction art and form no part of this invention. Generally the process involves the making of a pattern of the same configuration as the plaster tile. A negative mold is then made from the pattern. A fluidized gypsum-cement mixture is then poured in the female mold. A portion of the water combines with the gypsum and the resulting plaster is allowed to cure. After curing, the tile is removed from the mold and heat may be added to accelerate the drying process, preferably below 100 degrees C.

It is also helpful to spray the female mold prior to the addition of the slurry with a suitable wetting agent such as benzalkonium chloride. This prevents the formation of bubbles at the surface of the setting tile adjacent the mold.

We claim:

1. A stiff, light-weight, rigid, dimensionally-configured molded construction tile having structural integrity to retain its shape when hung comprising a combination:
   (1) gypsum plaster;
   (2) chopped glass fiber;
   (3) perlite; and
   (4) vermiculate;
said construction tile having a density between about 3 and about 25 gm/cubic inch.

2. The tile according to claim 1 wherein mica is present.

3. The tile according to claims 1 or 2 wherein the chopped glass fiber is between ½ to 1 inch in length.

4. The tile according to claim 1 wherein the glass is present at a level of about 2 oz. per square ft. of tile.

5. The tile according to claim 1 wherein the ratio of vermiculite to perlite is between 0.8 and 1.2 to 1.

6. The tile according to claim 1 wherein an agglomerating agent is present.

7. A stiff, light-weight, rigid, dimensionally-configured, molded construction tile having sufficient structural integrity to retain its shape when hung, said tile comprising in combination:
   (1) gypsum plaster;
   (2) chopped glass fiber;
   (3) perlite;
   (4) vermiculite; and
   (5) mica;
with the ratio of perlite to vermiculate being between 0.8 and 1.2 to 1.

* * * * *

UNITED STATES PATENT AND TRADEMARK OFFICE
CERTIFICATE OF CORRECTION

PATENT NO. : 4,687,694
DATED : August 18, 1987
INVENTOR(S) : Nina M. Kuper, et al.

It is certified that error appears in the above-identified patent and that said Letters Patent is hereby corrected as shown below:

In claim 1, line 3, "a" should read --in--;

In claim 1, line 8, "vermiculate" should read --vermiculite--;

In claim 7, line 10, "vermiculate" should read --vermiculite--.

Signed and Sealed this

Fifteenth Day of December, 1987

Attest:

DONALD J. QUIGG

*Attesting Officer*  *Commissioner of Patents and Trademarks*